UNITED STATES PATENT OFFICE.

EDWARD CURTIS AND ANDREW CROZIER, OF ITHACA, NEW YORK.

IMPROVED ROOFING-CEMENT.

Specification forming part of Letters Patent No. 52,973, dated March 6, 1866.

*To all whom it may concern:*

Be it known that we, EDWARD CURTIS and ANDREW CROZIER, of the town of Ithaca, in the county of Tompkins and State of New York, have invented an Improvement in Roofing; and we do hereby declare that the following is a full and exact description thereof.

Our object is to make a durable roofing possessing elasticity for quite a period of time and economic in its cost. For this purpose we use two rocks of the New York State geological series—the softer portions of the well-known Portage and Chemung groups, which are recognized wherever they occur by these or correlative titles. These we grind in any suitable mill, as a common plaster-of-paris or gypsum mill, and mix one or both with coal-tar in varied proportions, reference being had to the season of the year in which we cover a roof and to its steepness, so that the consistence shall prevent flowing of the mixture and yet there be as much elasticity as possible. A convenient rule is one-half of each, by bulk, but often more or less of the said ground rock is convenient.

Our mixture closes quite large cracks in the roof-boards, and shrinkage, swelling, and checking of unseasoned lumber does not destroy its utility, for by its nature our composition soon hardens on the outside, while it retains a softness for months or years beneath, thus giving ample time for the lumber to season, the roof to settle, and the roofing to adjust itself and yet retain an efficient surface.

We usually apply our roofing thus made with no felting or substance spread over the roof-boards, only stopping in any convenient manner the too large cracks. This done, we apply to the boards our mixture, and thus secure a roof that adheres too strongly to be blown or torn off, as is frequently the case where intervening substances are used, and when thus applied it hardens in the cracks and on the external surface and retains the elasticity spoken of.

Our material we also apply, when desirable, over roofs covered with felt, paper, cloth, tin, or other substances.

The uses of our invention are apparent to those skilled in the art to which it appertains.

We claim—

1. As a special article of manufacture, the ground rocks of the commonly-known Portage and Chemung groups, for the purpose of making a roofing material, as described.

2. The same when mixed with coal-tar and applied directly to the roof-boards, with no intervening substances, as a special design, as described.

3. The said special mixture of the said ground rocks and coal-tar, when applied over cloth, felt, tin, or other intervening substances, as described.

EDWARD CURTIS.
ANDREW CROZIER.

Witnesses:
SAMUEL J. PARKER,
A. M. LUCAS.